US008411562B2

(12) United States Patent
Chia et al.

(10) Patent No.: US 8,411,562 B2
(45) Date of Patent: Apr. 2, 2013

(54) NETWORK SYSTEM AND METHOD FOR PROVIDING AN AD-HOC ACCESS ENVIRONMENT

(75) Inventors: Pei Yen Chia, Singapore (SG); Pek Yew Tan, Singapore (SG)

(73) Assignee: Panasonic Corporation, Osaka (JP)

( * ) Notice: Subject to any disclaimer, the term of this patent is extended or adjusted under 35 U.S.C. 154(b) by 1562 days.

(21) Appl. No.: 11/569,413

(22) PCT Filed: May 26, 2005

(86) PCT No.: PCT/SG2005/000168
§ 371 (c)(1),
(2), (4) Date: Oct. 22, 2007

(87) PCT Pub. No.: WO2005/116841
PCT Pub. Date: Dec. 8, 2005

(65) Prior Publication Data
US 2012/0039326 A1  Feb. 16, 2012

(30) Foreign Application Priority Data
May 26, 2004  (SG) .................. 200402992-2

(51) Int. Cl.
H04L 12/56 (2006.01)
H04J 1/16 (2006.01)
(52) U.S. Cl. ......... 370/230; 370/252; 370/329; 370/401
(58) Field of Classification Search .................. 370/252, 370/230, 329, 401
See application file for complete search history.

(56) References Cited

U.S. PATENT DOCUMENTS

| 4,200,770 | A | 4/1980 | Hellman et al. |
| 8,006,087 | B2* | 8/2011 | Ginter et al. ................. 713/164 |
| 2004/0172558 | A1* | 9/2004 | Callahan et al. .............. 713/201 |
| 2005/0108423 | A1 | 5/2005 | Centemeri |
| 2005/0262362 | A1* | 11/2005 | Patrick et al. ................. 713/193 |

FOREIGN PATENT DOCUMENTS

WO  WO 00/46966 A2  8/2000

OTHER PUBLICATIONS

Derwent Abstract Accession No. 2004-714677/70, Class T01, JP 2004-287784 A (Fuji Xerox Co. Ltd) Oct. 14, 2004.
Derwent Abstract Accession No. 99-168457/15, Class W01, W02, DE 19738707-A1 (Siemens AG) Jul. 31, 2003.
Derwent Abstract Accession No. 2003-619374/59, Class T01, DE 10200681 A1 (Siemens AG) Jul. 31, 2003.
HTTP Authentication: Basic and Digest Access Authentication, IETF RFC2617, http://ww.ietf.org/rfc/rfe2617.txt.
IETF Authentication, Authorization and Accounting (AAA) Working Group, http://www.ietf.org/html.charters/aaa-charter.html.
USIM/SIM Application Toolkit (USAT/SAT); Service Description; Stage 1 (Release 5) 3GPP TS 22.038 V5.2.0.

(Continued)

Primary Examiner — John Pezzlo
(74) Attorney, Agent, or Firm — Baker Botts L.L.P.

(57) ABSTRACT

Network system and method for providing an ad-hoc access environment. A network system capable of providing an ad-hoc access environment comprises a controller unit connected to the network for receiving access requests from a device; and an authority unit for providing an authorization assertion to the controller unit; wherein the controller unit carries out an authorization process based on an access control policy including at least one rule based on which the controller unit contacts the authority unit and the authority unit provides an authorization assertion.

55 Claims, 11 Drawing Sheets

OTHER PUBLICATIONS

The MD5 Message-Digest Algorithm, IETF RFC1321, http://www.ietf.org/rfc/rfC1321.txt [3].

SHA1 Secure Hash Algorithm—Version 1.0, http://www.w3org/PICS/DSig/SHA1_1_0.html.

XML Encryption WG, http://www.w3.org/Encryption/2001/.

TLS Transport Layer Security, http://wwwietf.org/html.charters/tls-charter.html.

SSL—Secure Socket Layer, http:wp.netscape.com/eng/ss13/draft302.txt.

A system for managing authentication and service authorisation to achieve single-sign-on to access multiple network interfaces, PAT. 030.009, Chia, Pei-Yen and Cheng, Hong.

Entrust USB Tokens, http://www.entrust.com/tokens.

An Overview of Smart Card Security, Chan, Siu-cheung Charles, http://home.hkstar.com/alanchan/papers/smartCardSecurity/.

* cited by examiner

NETWORK SYSTEM AND METHOD FOR PROVIDING AN AD-HOC ACCESS ENVIRONMENT

CROSS-REFERENCE TO RELATED APPLICATION

This application claims priority to PCT/SG2005/000168, entitled Network System and Method for Providing an Ad-Hoc Access Environment, filed May 26, 2004.

TECHNICAL FIELD OF THE INVENTION

The present invention relates broadly to a network system capable of providing an ad-hoc access environment, and to a method of providing an ad-hoc access environment in a network.

BACKGROUND OF THE INVENTION

Currently, access to services on networks requires a user to go through a registration phase before the service is rendered to the user. Registration can be carried out by a service administrator or by the users themselves. The service administrator has the right to grant access rights to the users. A user may be allowed to login as a "guest" which has the same password for all user logging in or "anon" which may not require any password. However, most usually in order for this user to access the services, he again would need to register himself.

An example of basic authentication, e.g. as specified in HTTP authentication, is where there is a list of usernames, the user's associated password and access rights stored at the Server performing the Access Control. The entry into the user list can be carried out during registration. Registration can be carried out by the administrator or user. It requires a user to register his/her userid and a corresponding password. The next time this user is prompted for login, the user needs to produce this same registered userid and password to be authenticated.

Alternatively, a user can also register itself by going to an automated registration page which allows the user to key in his/her personal particulars. The user can also key in his/her preferred password, which will be used for subsequent logins. Alternatively, passwords can be assigned and sent to the user separately, e.g. via email, text message from phone or mail. The next time the user logs in, he/she has to use the assigned password. Usually, user is only allowed to change his/her password after logging in.

The registration process is an adequate method for checking the identity of frequent users during the authentication process. It enables easy checking on both the user identification and the access rights assigned to it. However, registration of users requires a database of user information to be maintained. As the list of registered users grows, the entries in the database are increased and become difficult to maintain. Hence, in order to maintain a database of reasonable size, ad-hoc users who would like to gain network and use some services only on a temporary basis, and who most likely will not access the same network again, should not need to go through the registration process. Similarly, where registered users seek e.g. a temporary extension of their registered access rights to different services, those registered users, should not need to go through effectively a re-registration process. Therefore other means of authentication and authorization of users of networks may be desired.

SUMMARY OF THE INVENTION

In accordance with a first aspect of the present invention there is provided a network system capable of providing an ad-hoc access environment, the network system comprising a controller unit connected to a network for receiving access requests from a device; and an authority unit for providing an authorisation assertion to the controller unit; wherein the controller unit carries out an authorisation process based on an access control policy including at least one rule based on which the controller unit contacts the authority unit and the authority unit provides an authorisation assertion.

In accordance with a second aspect of the present invention there is provided a method of providing an ad-hoc access environment in a network, the method comprising receiving access requests from a device utilising a controller unit of the network; and providing an authorisation assertion to the controller unit utilising an authority unit of the network; wherein the controller unit carries out an authorisation process based on an access control policy including at least one rule based on which the controller unit contacts the authority unit and the authority unit provides an authorisation assertion.

The authority unit may resides on a mobile device accessible to a user with administrator rights.

The authority unit may require an assertion from the user with administrator rights for providing the authorisation assertion to the controller unit.

The device requesting access to the network may not be registered with the network.

The device requesting access to the network may be registered with the network, and the access request comprises a request for a service for which the registered device does not have access rights.

The controller unit may comprise a data base for storing user registration information and a state table for storing current state information of each device residing in the network.

The controller unit may comprise a registration program for registering a device to the network.

The registration program may be activated based on an administrator key recognised by the controller unit as associated with administrator rights.

The administrator key may be received from a storage device external to the controller unit.

The registration program may instruct the controller unit to request user registration information from a device requesting to register, to generate a verification including a registration key based on the received user registration information, and to provide the verification including the registration key to said device.

The registration program may further instruct the controller unit to provide a temporary key to said device for encrypt the user registration information, and to decrypt the received encrypted user registration information.

The registration program may further instruct the controller unit to hash the user registration information and to store the hashed user registration information in a secure database of the network.

The registration program may be configured to have a device registered to the registration program, to configure said device with rights to host the authority unit, and to configure the controller unit to contact said device when an authorisation assertion is required.

The registration program may instruct the controller unit to provide an access token to the registered device, and the registered device sends a future access request together with said access token for verification.

The controller unit may issue a new access token after each successful login by said registered device.

The controller unit may receive user information together with the access request, checks the user information, sends an authorisation assertion query to the authority unit, and grants or denies access based on the authorisation assertion received from the authority unit.

The controller unit may receive user information together with the access request, checks the user information, and grants or denies access based on information stored in a database accessible to the controller unit.

The controller unit may contact the authority unit for an authorisation assertion based on the access control policy, and if an access request is received without a valid token indicative of ad-hoc access rights.

The controller unit may contact the authority unit for an authorisation assertion based on the access control policy, and if an access request is received from a registered device without access rights to a device specified in the access request.

The access control policy may comprise rules depending on a current location of the authority unit.

The controller unit may send a control message to a network protocol access layer of the network to request to enable or disable a local port, and receives an acknowledgement from the network protocol access layer indicating whether the local port is enabled or disabled.

The authority unit may send a control message to a network protocol access layer of the network to request to enable a local port, and receives an acknowledgement from the network protocol access layer indicating whether the local port is enabled or disabled.

A network protocol access entity may send a control message to the controller unit or the authority network of the network to enable or disable a local port, and receives an acknowledgement from controller unit or authority unit whether the local port is enabled or disabled The access control policy may comprise a rule such that access to the network requested by a non-registered device is granted only if the authority unit is present in the network.

The authority unit may send a message to the controller unit based on input from a user with administrator rights indicating revocation of access rights of a device.

The controller unit may remove a table entry of said device and terminates an ongoing session of said device.

Said device may be a registered device, and the controller may delete a registration entry of said registered device, invalidates an access token of the de-registered device, and denies a future access request by the de-registered device.

The network may comprise an access network with protocol processing entities capable of network connectivities using different or similar network protocol stacks, and the device requesting the access comprises one of the network protocol stacks.

A format for control messages between the controller unit and a network access protocol unit of the access network may comprise one or more of a group consisting of network type for identifying a network interface, network address for identifying the network address of a network entity seeking network connectivity, enable/disable flag to indicate enable or disable network connectivity by enabling or disabling the network protocol stack controlling the network connectivity as identified by the network type, passphrase during the active session between the protocol stack of the network type and the controller unit of the authority unit, token key identifying the authority unit or the controller unit to the network protocol stack, and req/ack which is a request of an action within a session.

BRIEF DESCRIPTION OF THE DRAWINGS

Embodiments of the invention will be better understood and readily apparent to one of ordinary skill in the art from the following written description, by way of example only, and in conjunction with the drawings, in which.

DETAILED DESCRIPTION OF THE INVENTION

Figure 1:
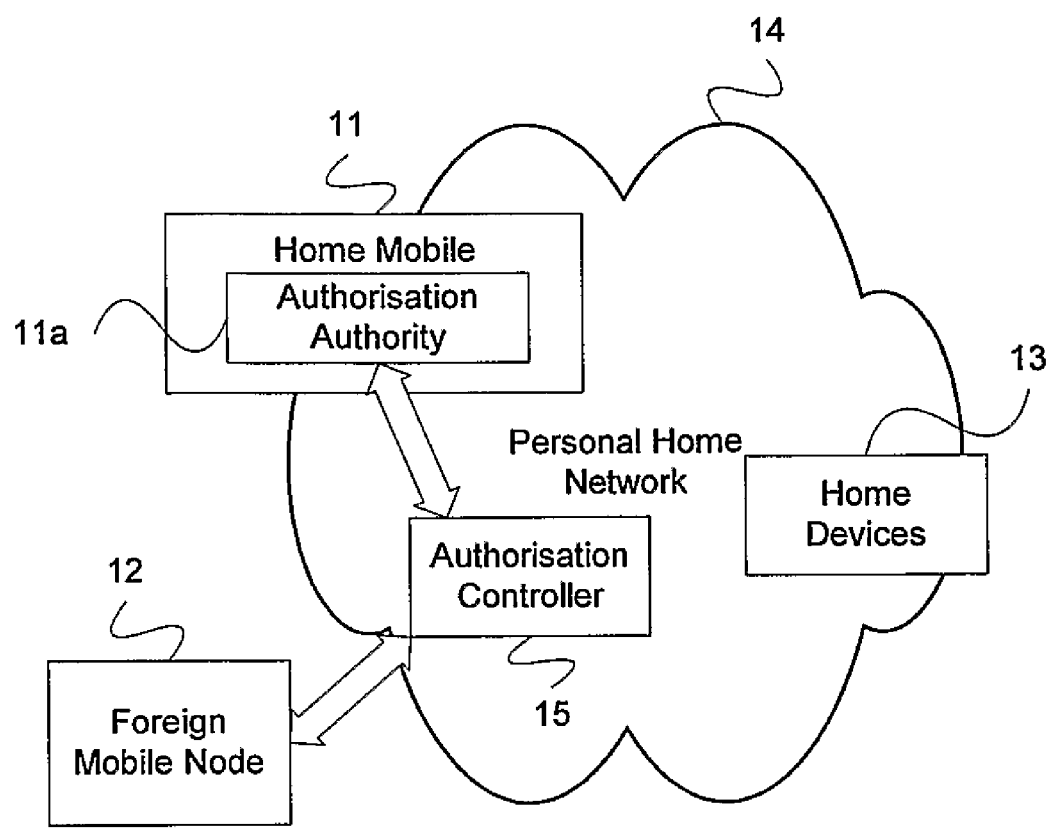
FIG. 1 is a schematic drawing illustrating a network access control to support ad-hoc access according to an example embodiment.

In an ad-hoc access environment, it may be undesirable to manage user registration and the database resources required, as more and more users register. The ad-hoc users may be those that need to use the network resources temporarily and rarely will access the same network again. Example embodiments of the invention provide the system and methods to authenticate and authorize users who are not registered to the network or to all or some groups of registered user who require additional assertions.

For simplicity of illustration in the example embodiments that follow, users who need to gain access to a network are split into 2 groups, one being registered users, the other non-registered users. The authentication and authorization process for registered user will require the user to input his/her credentials and provide other information such as password, valid token, and/or keys required for the authentication process. This information can be manually keyed-in or stored at a storage location. The authentication process will check the information provided by the user and compare it against the information registered into the database.

For a non-registered user, the authentication and authorization process is different. A user who is not registered to the network needs to request network access and services associated with the current request. Embedded with this request is the user description. During the authentication and authorization process, an Authorization Controller of the network will first check the registration database, and find that there is no entry of this user, and will prompt for an assertion from an Authorization Authority.

The Authorization Controller is configured such that it will know which Authorization Authority to contact. The relevant Authorization Authority will usually be embodied in a user with administrative rights. In one example embodiment an Authorization Authority will reside in a mobile device. The mobile device may be a personal handheld device which the user with administrator rights is likely to carry around. The user with administrator rights may also be the administrator of the network. A Personal Home Network environment is one example network whereby the home owner is the administrator of his/her Personal Home Network. A Personal Home Network is a private network connecting devices which range from consumer electronic devices, personal computers, and also mobile devices. Therefore, the home owner's personal handheld device would be a convenient choice to host the Authorization Authority. When the network receives a request from a non-registered user, the network will inform the Authorization Authority of such a request. The Authorization Authority will prompt the user with administrator rights of the request and the administrator rights user will decide whether to grant access according to the request. The decision will be passed back to the Authorization Controller. When the Authorization Controller receives the instruction from the Authorization Authority, the Authorization Controller will proceed to grant or deny access to the request based on the instruction from Authorization Authority.

A network system and methods of performing access control to devices accessing a network at an ad-hoc basis according to different example embodiments will now be described in detail.

In the following description, for purposes of explanation, specific numbers, times, structures, protocol names, and other parameters are set forth in order to provide a thorough understanding of the example embodiments. However, it will be apparent to a person skilled in the art that the presented invention is not limited to these specific details.

FIG. 1 shows an example embodiment of the invention for performing authorization based on conditions applied when access attempts are carried out. The conditions can be specified in a policy or rules accessible by an Authorization Controller (15) that manages access attempts to the network (14). The conditions may vary. One example condition can be on the availability of the "Authorization Authority" (11a) and the decision from the "Authorization Authority" (11a) whether to admit a device (12) that requests for access to the network (14) managed by the Authorization Controller (15). For this embodiment, a personal home network (14), comprises of a network of consumer electronic devices (13), personal computers and mobile devices etc. which are inter connected. Also, a mobile node (12) is used in this embodiment as a device requesting for network access. It will be appreciated by a person skilled in the art that in different embodiments the invention can be applied to any network node requesting access to any network comprised of any connected devices.

A mobile node is considered as a node that comes in and out of the personal home network many times. A mobile node may be categorized into three categories. The three categories are a "trusted mobile", for example being the home owner's mobile device (11), a "semi-trusted mobile", for example being the home owner's friend's mobile which may be allowed limited access, and a "non-trusted mobile" which is not allowed access at all.

In order to differentiate the 3 categories of mobile terminals in the example embodiments, the following criteria are employed. The "trusted mobile" needs to be a registered device. A "Semi-trusted" mobile and "non-trusted" mobile are not registered. "Semi-trusted" mobile can obtain access rights on a per-session basis. A "Non-trusted" mobile will not be granted access rights at all. However, any other criteria and means for differentiating the categories of mobile may be employed.

The embodiment shown in FIG. 1 provides the means for authorization to be carried out without the need for a device to register, and thus can apply to mobile terminals of all 3 categories. This will be especially useful whenever temporary visitors to the Personal Home Network (14) need to tap into the networks resources and the administrator can allow this temporary usage to the visitor without the need to go through a tedious registration process. The Home Mobile Node (11) hosts the "Authorization Authority" (11a). Home Devices (13) offer services and resources which are all connected at the Personal Home Network (14). The Authorization Controller (15) of the Personal Home Network (14) manages all incoming requests for connectivity.

The Home Mobile Node (11) is a trusted mobile entity in the Personal Home Network (14). For this embodiment, the home owner is assumed to own the Home Mobile (11) which he/she carries around, and therefore is a suitable candidate to host the "Authorization Authority" (11a). However, it is appreciated by a person skilled in the art that the "Authorization Authority" (11a) can be hosted anywhere where the Authorization Authority can be reached by the Authorization Controller (15).

Figure 2:
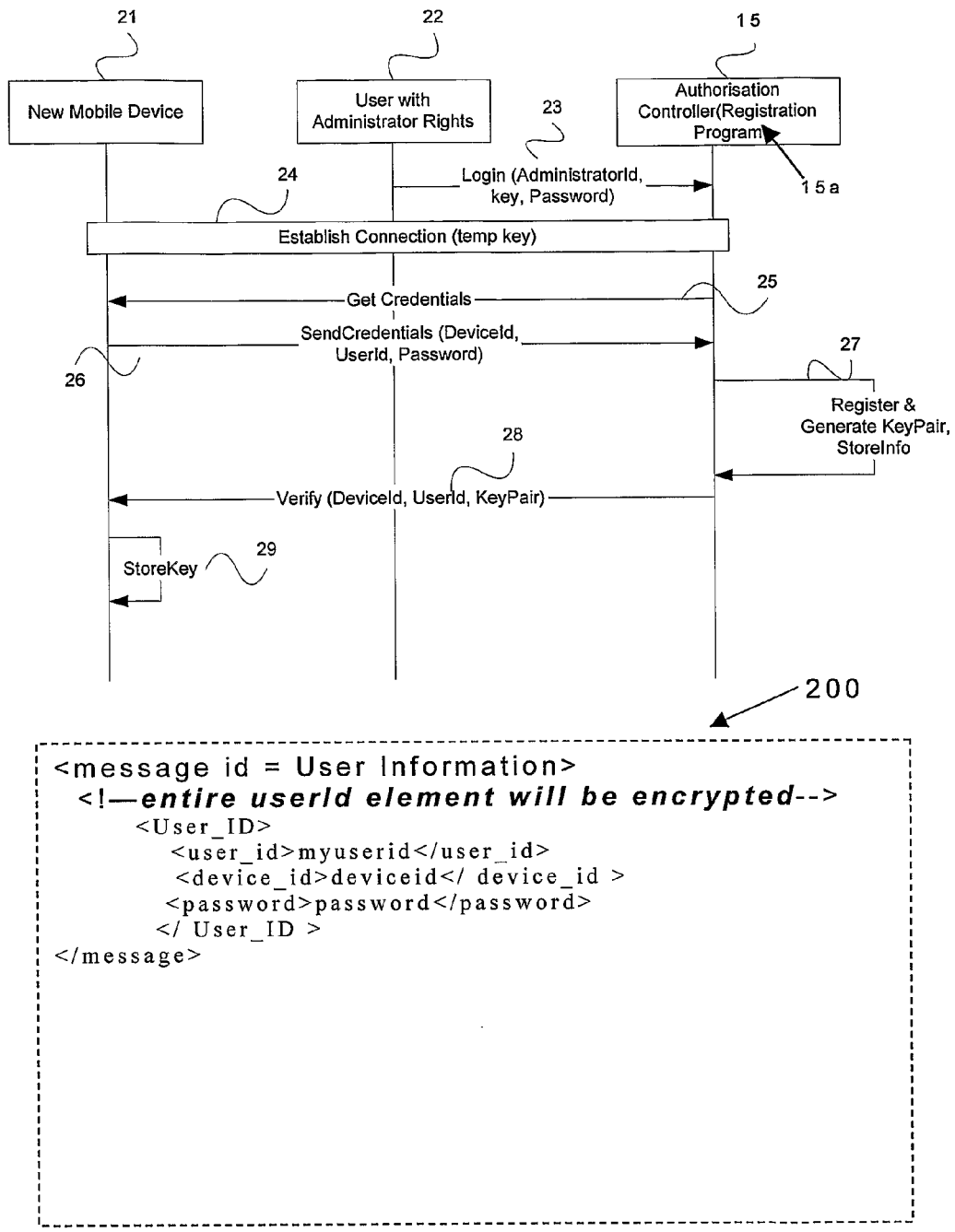
FIG. 2 is a schematic drawing illustrating a registration process of a new device to a person home network according to an example embodiment.

FIG. 2 illustrates how a new mobile device (21) is registered with the Authorization Controller (15) via the Registration Program (15a) of a Personal Home Network. First, a user with administrator rights (22) needs to activate the registration program (15a) of the Authorization Controller (15) and logs in as an administrator (23). The administrator logs in using his/her administrator password. However for a more secure login, the administrator may also need to present a valid key to activate administrator rights. A valid key may be stored in a smart card, memory card, SIM/USIM, USB tokens or any other storage device. Once the registration program (15a) is activated, the new device (21) can register with the Authorization Controller (15). All registered device information will be stored into a secured file or secure database. Hashing methods such as MD5 or SHA-1 can also be applied to the registered information such as the passwords, to avoid password theft during storage of registered information.

Information to be registered manually typed in by the user (22) with administrator rights. Alternatively the registered information can be obtained from the new device (21) to be registered. The registration program may establish a connection (24) with the new device (21) in order for the device (21) to present its userid, the Device Id and also a preferred password to the registration program. The registration program will make a request (25) for the user credentials from the new device and the credentials can be passed back (26) from the new device. The message format to convey user information can be in an XML document making use of XML Encryption to encrypt the UserId Element. An example format for user information for requesting connection is shown at numeral 200 in FIG. 2.

In one embodiment, a temporary key may be passed to the device (21) requesting to be registered so that the registration information can be protected using encryption during message delivery. This temporary key may be a public key of the registration program (15a) of the Authorization Controller (15) that needs to decrypt the registration information or the key may be a random key pair generated by the registration program, e.g. using the Diffie-Hellman method.

The registration program will store the user registration information comprising the userid, deviceid and password.

The user registration information can be stored in a secured database or any other storage device. The user information may not be stored "raw" to protect against theft. A one-way hash function such as MD5 or SHA-1 may be applied to the user registration information so that user privacy can be protected. It will be appreciated by a person skilled in the art that any other technique to protect privacy may be applied, including any other one-way hash function.

With the User Registration Information, comprising the userid, deviceid and password information, a key pair is generated (27) in the example embodiment. One half of the key pair is stored by the Authorization Controller (15) into a database and the other half of the key pair is to be distributed (28) to the device (21) that's been newly registered. This newly registered device (21) will store the key (29) into its local storage. This key can be used as a valid token for subsequent access.

The scenario in FIG. 2 shows the device and user information are co-located. In an alternative embodiment the device and user information are not co-located. This could be the case when the user information is stored somewhere outside the device, rather is captured in a storage device. The storage device can be in a SIM/USIM or memory card, or on other locations hosted by another service provider. In this case, the storage device is connected to the registration program, and when the registration program completes, the key from the Authorization Controller (15) can be stored back to the same storage device. This may have the advantage of a userid being portable. Therefore, in the described embodiments the deviceid will not be part of the registration information. This however, may have the drawback of less stringent checking if the deviceid is not checked during later authentication.

After a successful registration, the next time the device (21) is prompted for authentication, the device (21) will need to produce its userid, deviceid, password and also the valid key. If the registered user does not have deviceid as part of the registration information, then deviceid will not be used during authentication, as mentioned above. If authentication is successful, connection will be granted and the device's access rights are the rights that have been granted during the registration process.

There may be an alternate embodiment in which a registered device hosts the "Authorization Authority". The "Authorization Authority" has the right to force the Authorization Controller (15) to grant access to any device requesting access to the network. Similarly, the "Authorization Authority" can also instruct the Authorization Controller (15) to terminate existing connections at any point in time. The registered device can also be a mobile device. Therefore, once a device is registered, it can also be configured to host the "Authorization Authority". The "Authorization Controller" (15) will also be configured to know where the current "Authorization Authority" resides. The "Authorization Authority" and "Authorization Controller" (15) may be co-located.

Figure 3:
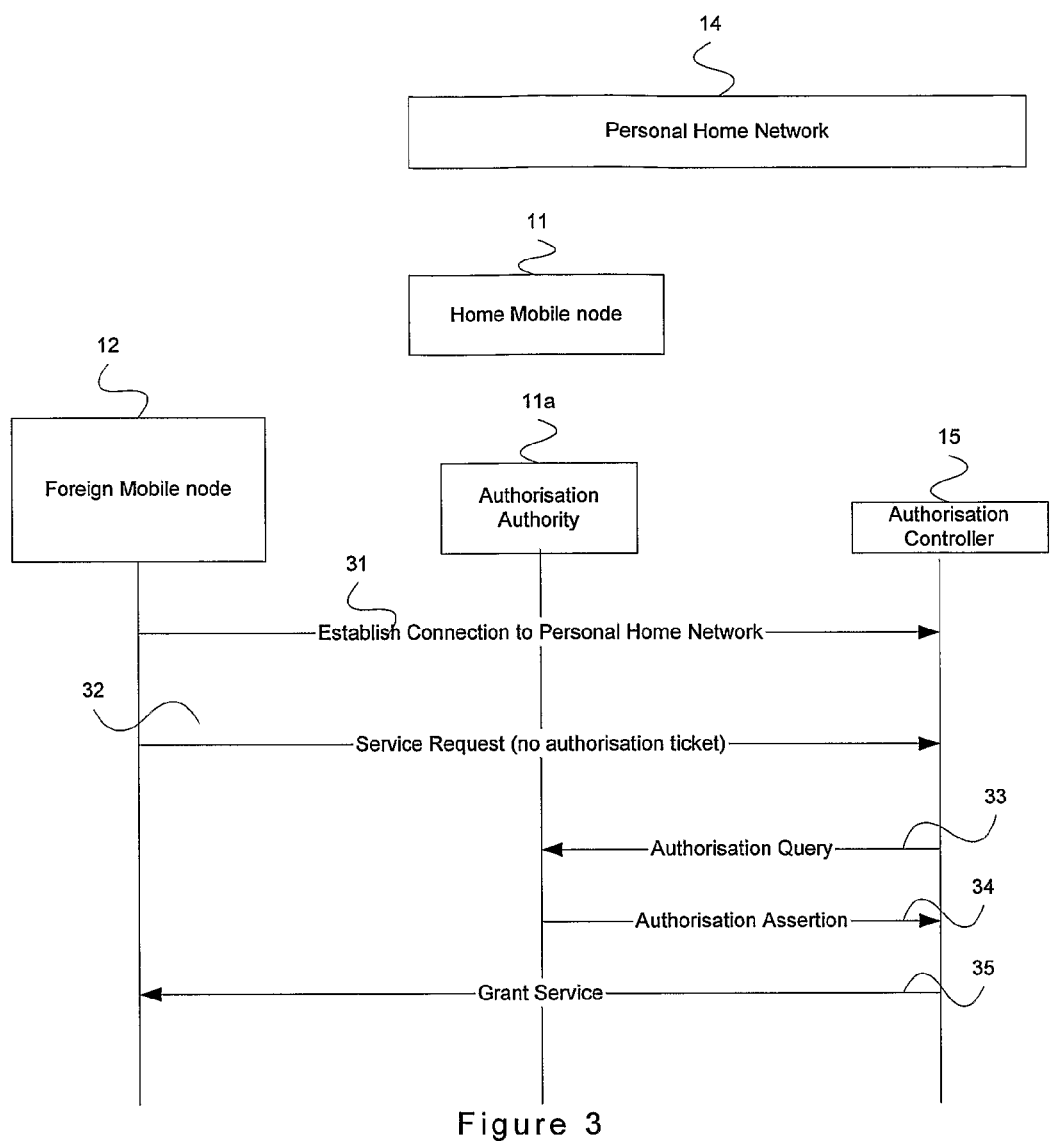
FIG. 3 is a schematic diagram illustrating managing access control of a foreign mobile node according to an example embodiment.

FIG. 3 illustrates a scenario where a foreign mobile node (12) enters and associates with the Personal Home Network Environment (31). The node (12) requests to access the Personal Home Network (14) without a valid key or ticket (32). The "Authorization Controller" (15), upon receiving a request without a key, will query the "Authorization Authority" (11a) which in this embodiment is hosted at the home owner's mobile (11) to obtain an "Authorization Assertion" (33). In this instance, the owner's mobile terminal (11) is the "Authorization Authority" (11a) making the authorization decision. It may be assumed that the owner carries with him the mobile terminal (11) most of the time. The "Authorization assertion" (34) may be either manual or automated. A manual authorization requires a user response to an authorization query. Therefore once, an "Authorization Assertion Query" (33) sent to the "Authorization Authority" (11a) a manual response is required and the owner has to key in the "Authorization Assertion" (34). When the Authorization Controller (15) receives the Authorization Assertion (34), the Authorization Controller (15) will grant the requested service the requestor (35). To enhance security, the "Authorization Assertion" may have to be accompanied by a valid key and password.

In order to enhance security, the key may be updated periodically, e.g. each time the "Authorization Authority" (11a) enters the Personal Home Network (14) and when there are no unregistered devices detected at the Personal Home Network (14). However, it will be appreciated by a person skilled in art that the frequency of updating can vary, such as manual prompting for key updates. Alternatively, the frequency of key updates may be pre-negotiated between the "Authorization Authority" (11a) and the Personal Home Network (14).

For an extra level of protection, each Authorization Assertion (34) may need to be accompanied by a valid key and a valid code which is only known to the user of the mobile node (11) that hosts the Authorization Authority (11a). A valid code may be as simple as a pass phrase or a password. This has to be provided for each authorization assertion (34) in order to minimize "wrong" "Authorization Assertion" (34) when the valid owner's mobile device (11) falls into the wrong hands. Also if the Authorization Controller (15) does not receive Authorization Assertion (34) within a certain timeframe, the service may be denied to the requester in this embodiment.

If the requesting mobile node is the home mobile node (11), then the Authorization Controller (15) at the personal home network (14) may not prompt an "Authorization Assertion Query" (33) because the home mobile node (11) is a trusted node. In order for the home mobile (11) to identify itself as a trusted node, the system may need some identification from the mobile node (11) to differentiate it as a "trusted node" as opposed to a "non-trusted" node. One method would be to register the trusted mobile node. However, any other device identification may be employed as long as the Authorization Controller (15) can identify the device as a trusted node.

The steps illustrated in FIG. 3 can also be applied to grant access rights to a registered device. The assumption that a "home mobile node" has full access to all devices may not be true. Take the example of a family residing in a household with a Personal Home Network environment. Both parents may have full access to all the devices, and the child given limited access in order to limit the child's access to playing games on the game console. Each time the child tries to access the services at the "game console", an authorization assertion query will be sent to the Authorization Authority to obtain the authorization. Only when permission is granted, will the child get access to the game console.

Figure 4:
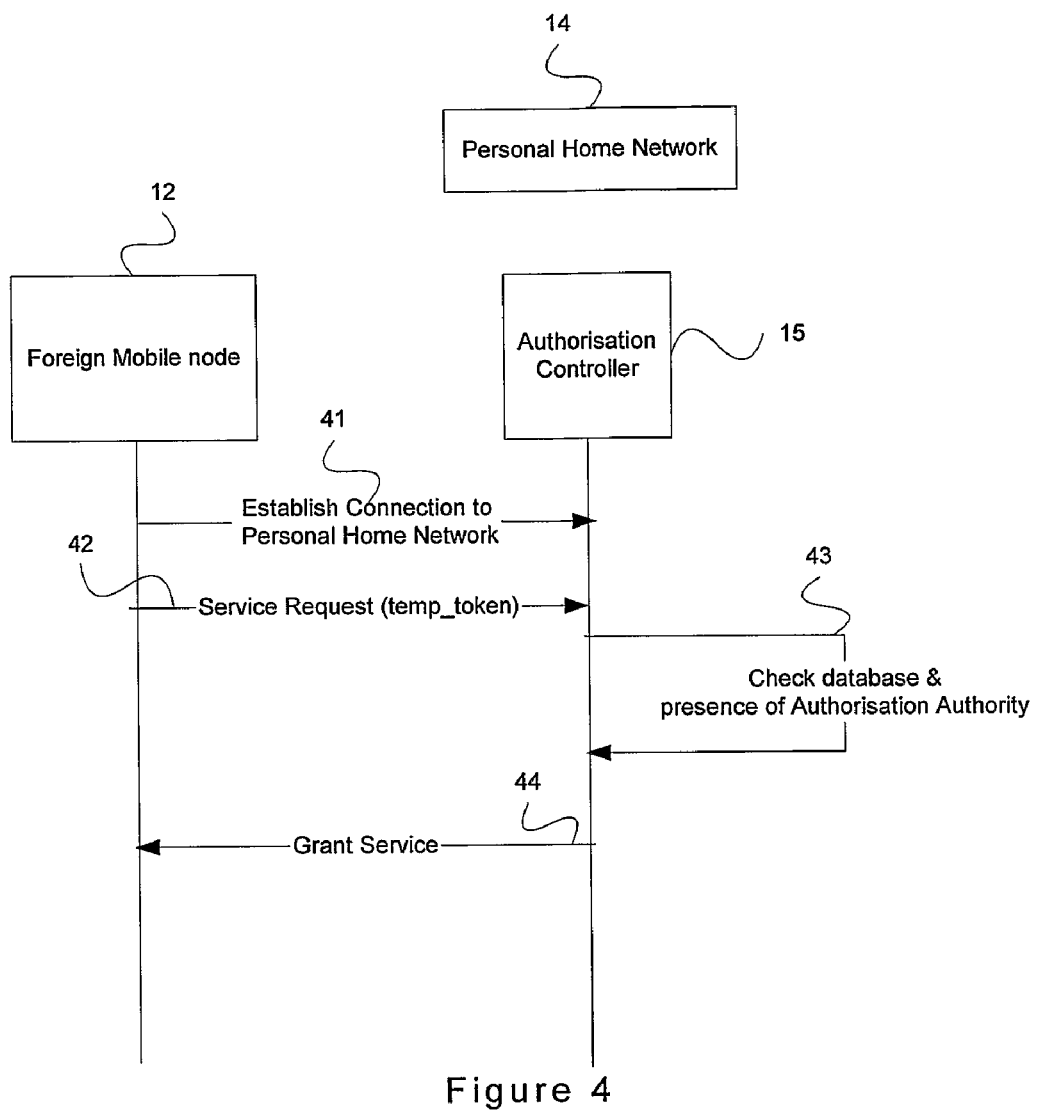
FIG. 4 is schematic diagram for managing access control of foreign mobile node.

Another method to authorize a non-registered device in example embodiments is to distribute temporary tickets or tokens which have a limited access rights and lifespan. This method may also be employed to temporary visitors to the Personal Home Network (14). This may have an advantage over having the Authorization Controller (15) handing out a guest password to users which would require the Personal Home Network administrator to change the password each time in order to avoid people having the guest password from accessing the Personal Home Network (14) again at another time. This method is illustrated in FIG. 4. A device (12) which is not registered associates with the Personal Home Network (41). However, this non-registered device (12) has previously been issued a temporary token. The device (12) uses this token to request a service (42). Since the Authorization Controller (15) checks the database and recognizes the token as a temporary token (43), the Authentication Controller (15) will not require a credential check, and compares only the service request against the access rights allocated to this temporary token. If the service request is within the access rights, then the service will be granted (44). For additional security, the presence of the Authorization Authority at the Personal Home Network is checked as well (43). This criteria may be stated at the Access Control policy. The presence of Authorization Authority acts as a "key" to unlock the network to non-registered devices. This gives a home owner more control over who to allow entry and at the same time does not require him/her to key-in the authorization assertion each time a non-registered device requests to access the home network.

The temporary token may be distributed to the mobile node (12) either via a storage device such as a memory card like Secure Digital, Memory Stick, or SIM/USIM card. However, any other suitable means to distribute this said temporary token may also be used.

In order to minimize packet traffic to the "Authorization Authority", a condition may be set such that an "Authorization Assertion Query" will not be sent to the "Authorization Authority" for registered devices, or when the condition at the Access Control Policy does not require Authorization Assertion from the Authorization Authority.

Figure 5:
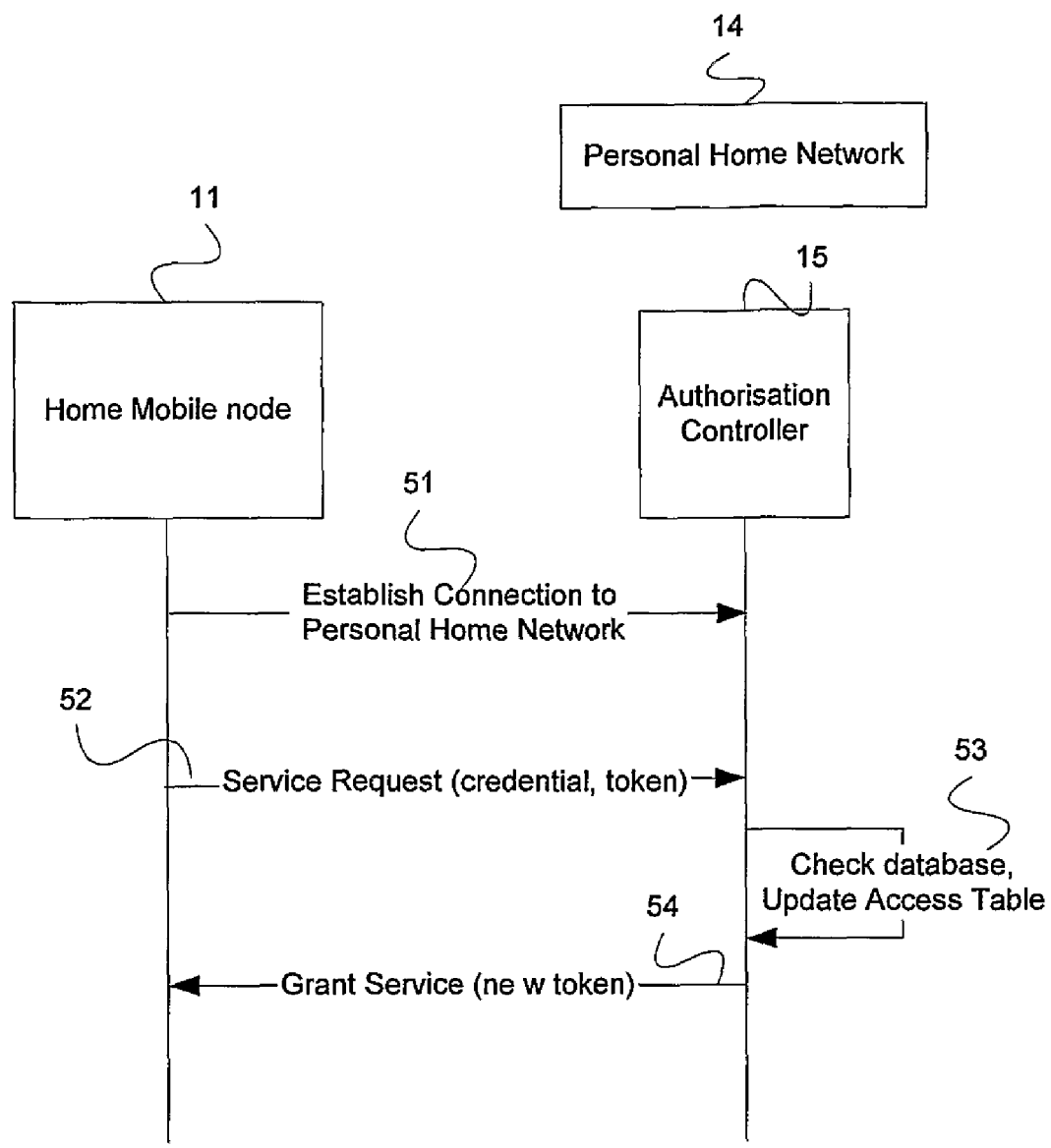
FIG. 5 shows a schematic diagram illustrating managing access control for a home mobile node according to an example embodiment.

The steps for authorizing a registered device in such an embodiment are illustrated in FIG. 5. A home mobile node (11) which is a registered device enters the Personal Home Network (14), and establishes a connection (51). When the home mobile node (11) requests a service for the first time, the home mobile node (11) will need to present its credentials and token (52). The Authorization Controller (15) will check the credentials which include the registered information at the database of the user such as userid, deviceid and password together with the valid token received (53). The token used by this user is provided to the mobile device after a successful registration. However, to enhance security, this token may be updated periodically. One example is after each successful login (54), new tokens may be provided for the next login. The frequency and condition to update the token may also be specified in the Access Control Policy.

The registered user need not provide its user credential multiple times for each service request in the example embodiment. During the first service login, user credentials are provided to authenticate the user and device, after which an entry into a temporary table stating that user with Token A has already been authenticated may be made. Therefore, for a subsequent service request, the user may only need to provide Token A for authorization. The table entry may be updated each time a device enters a network and deleted each time the device leaves the network.

Figure 6:
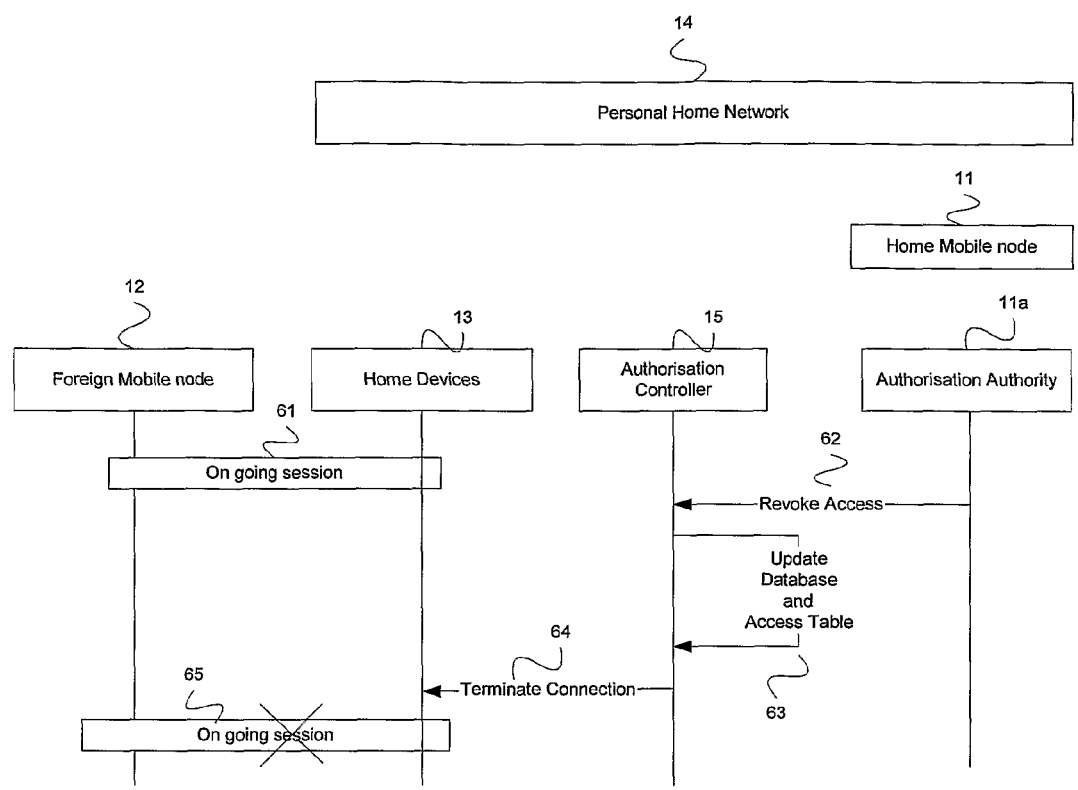
FIG. 6 is a schematic diagram illustrating terminating access rights of a foreign mobile node according to an example embodiment.

Referring now to FIG. 6, the Authorization Authority may or may not reside at the same network as the Personal Home Network (14). This may be the case when the "Authorization Authority" which resides at a "home mobile device" is outside the "Personal Home Network" (14) domain. An Authorization Assertion Query may still be sent to the Authorization Authority, but since it resides in a WAN, extra security may need to be employed. Transport Layer Security (TLS) or Secure Socket Layer (SSL) techniques may be used to secure the transport layer. Messages passed between the Authorization Authority at the mobile node and the Authorization Controller (15) at the Personal Home Network (14), may be encrypted. For example, XML Encryption can be used if the messages are in XML format. However, other forms of message level security may be employed to avoid "attack" in different embodiments.

In order for the Authorization Controller (15) to contact the Authorization Authority, the Authorization Controller (15) needs to know the current location of the Authorization Authority or alternatively needs to know the location to send to, e.g. a proxy location that knows where to forward the information to ultimately reach the Authorization Authority (11a). For the remote cases, the Authorization Authority (11a) should be contactable. In this embodiment, since the Authorization Authority (11a) is essentially mobile, its location is updated in order for the Authorization Authority (11a) to be contactable. One method is for the Authorization Authority (11a) to rely on a third party to update its current location. This third party may act as a proxy for the Authorization Authority (11a). Therefore, all the Authorization Controller (15) needs to do is to contact the proxy and rely on the home agent to contact the Authorization Authority (11a).

A session may be terminated and access control revoked by the Authorization Authority at any point in time. This is illustrated in FIG. 6 which is an example of an ongoing session (61) of a foreign mobile terminal (12) with a home network device (13). The Authorization Authority (11a) will be aware of this ongoing session. Should the Authorization Authority (11a) decide to terminate the session and revoke all access rights of this foreign mobile (62), the Authorization Authority (11a) needs to inform the Authorization Controller (15) that enforces the access point to terminate the session and connection association (62). The Authorization Controller (15) will update the "Access Table" to ensure (63) that the entry of access level is deleted for the "foreign mobile" (12) whose access is revoked. After the entry is deleted, the Authorization Controller (15) will contact the Home Device(s) (13) that has established a connection with the "foreign mobile" (12) whose access is revoked to terminate any ongoing sessions (64) and disconnect the connections. Therefore, any ongoing sessions with this mobile device (12) and the home Device (13) will be stopped and terminated (65).

A registered user can also have its network access revoked. A registered user may not have administrator rights and a user with administrator rights can revoke the rights of other users without administrator rights. This will lead to modification of the registration database and also invalidates the existing token. The next time this registered user requests for service with the previous token, access will be denied.

Figure 7:
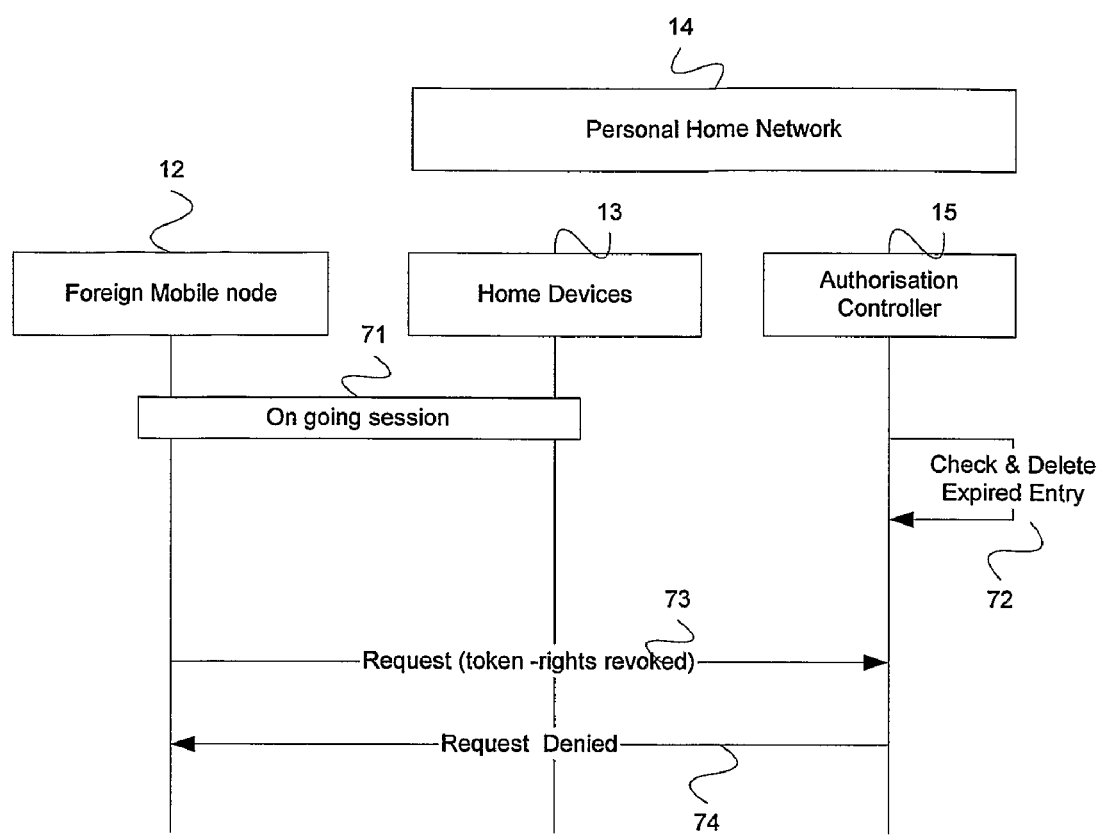
FIG. 7 is a schematic diagram illustrating denying access to an expired token according to an example embodiment.

Another scenario in which access control may be revoked is when a token expires as illustrated in FIG. 7. When a token expires, the corresponding entry at the database will be deleted (72). However, this may not terminate an ongoing sessions (71), but access will not be granted to a request with an expired token (73, 74).

Figure 8:
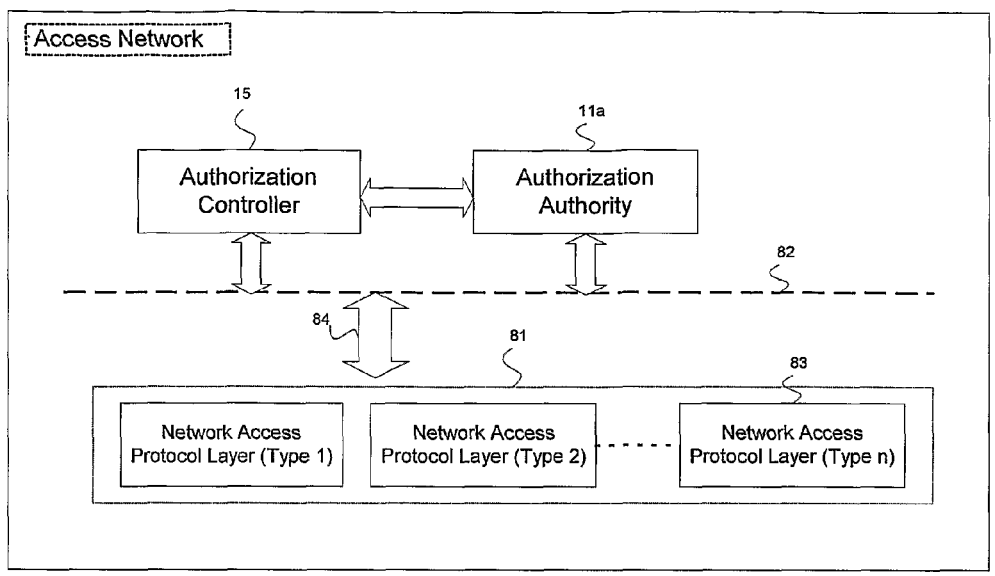
FIG. 8 is a schematic drawing illustrating Network Protocol Stack Connectivity Access Control according to an example embodiment.

The services to be granted may be further controlled by enabling and disabling the network connectivity to different categories of devices. FIG. 8 illustrates an access network with protocol processing entities capable of network connectivities using different or similar network protocol stacks. The entities that initiate the control messages to enable network access are the Authorisation Authority (11a) and Authorisation Controller (15) and the entity that receives and acknowledges the control messages sent is the network protocol stack or entity responsible for controlling the operations of the protocol stack (81). The Entity (81) is a representation of a functional block containing a number of network accesses, where each network connectivity is realized by a Network Access Protocol Layer (83). Example of Network Access Protocol layer types include Bluetooth, Wireless LAN and Ethernet. Each network node may host one Authorization Authority, one Authorization Controller or both Authorization Authority and Authorization Controller. An abstract interface (82) allows the Authorization Controller (11*a*) and Authorization Authority (15) to have control messages passed to and from the different Network Access protocol layers of Type 1, 2 or N (83), as illustrated in FIG. 8. The message exchange between Authorisation Authority (11*a*) or Authorization Controller (15) and the entity (81) may go through the abstract interface (82) via a communication channel (84). The communication channel (84) may be an internal bus on the same network node or another network communication channel. The message between Authorization Authority (11*a*) and Authorization Controller (15) and entity (81) may take the Network Access Control Data structure format shown at numeral 800 in FIG. 8.

Figure 9:
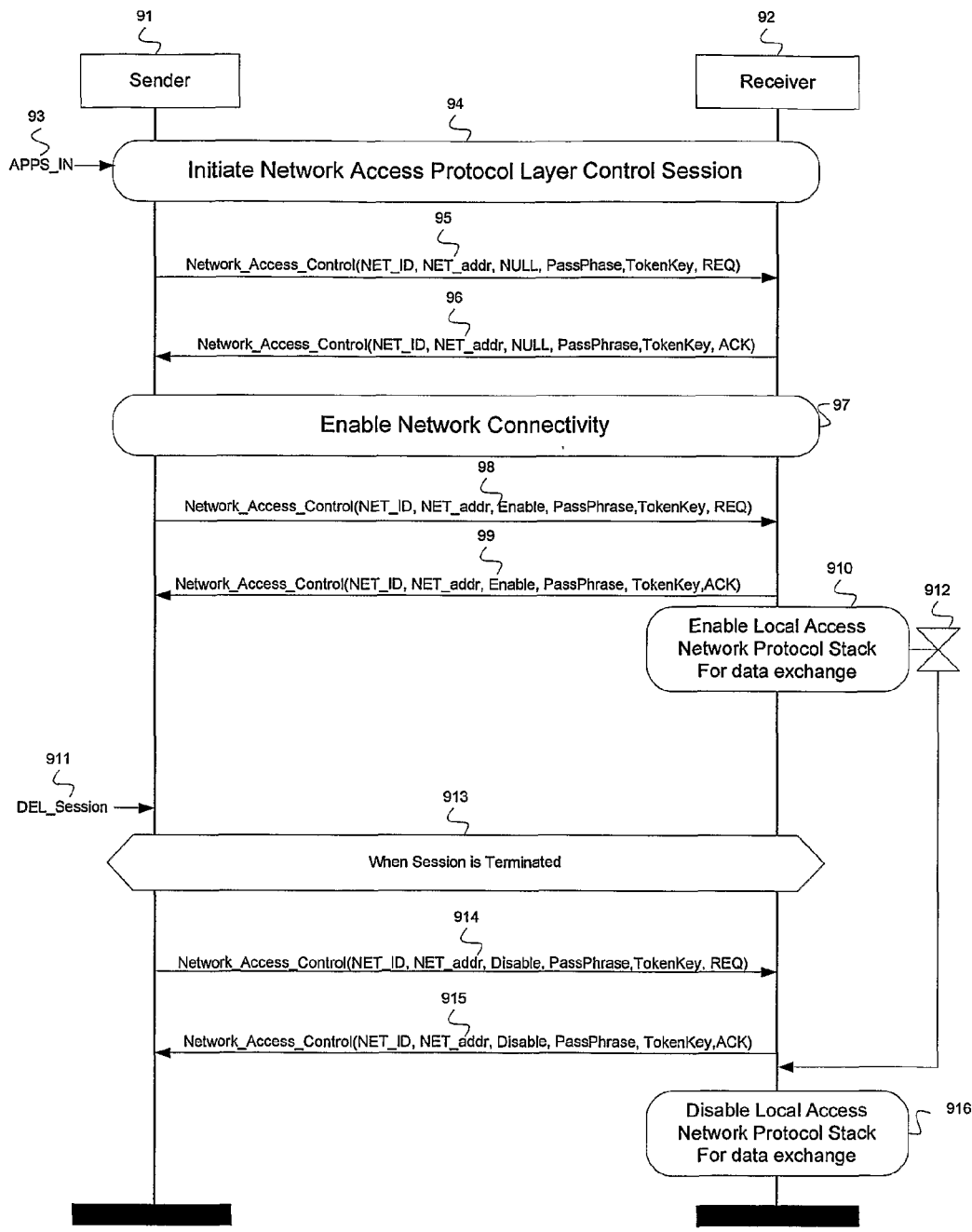
FIG. 9 is a schematic diagram illustrating sender triggered access control between a network protocol stack unit, an Authorization Authority, and Authorization Controller according to an example embodiment.

FIG. 9 shows a possible implementation of a sender (91) to represent entities marked by (11*a*) or (15) or both (11*a*) or (15) in FIG. 8 and a receiver (92) to represent the control entities of Network Access Protocol Layer (83) in FIG. 8. FIG. 9 also depicts an example life cycle of a receiver (91) and a sender (92) based on the message exchange between the receiver (91) and the sender (92) where the message follows the format described in the structure Network_ACCESS_Control at numeral 800 in FIG. 8.

It is assumed here that for a communication channel controlled by a Network Access Protocol Layer (83), certain control and data exchanges are necessary for protocol layer authentication and essential messages exchanges of data such as data in the format described in the Network ACCESS_Control structure are permitted. However, data exchanges relating to content delivery between different network nodes through the network communication channels controlled by any of the corresponding Network Access protocol Stack encapsulated in the block (81) (FIG. 8) are not allowed.

A control session for the sender (91) to control a specific network access protocol layer (83) (FIG. 8) begins (94) after a trigger signal (93) is received from an external input. External input include input signals or messages received from other nodes processed by Authorisation Authority (11*a*) or Authorisation Controller (15) (FIG. 8) or as a result of coordinated processing by Authorisation Authority (11*a*) and Authorisation Controller (15) (FIG. 8) and from a User Interface. Using a generated PassPhrase by the Sender (91) or together with a token key, such as a USB Token Key, the sender (91) sends the message with data message encapsulated with the Network_ACCESS_Control structure to the Receiver (95) seeking to set up a control session. A positive acknowledgment is received by the sender (91) with a receiver generated PassPhrase (96). The control session can now begin to enable or disable the network connectivity (97) with the PassPhrase exchanged. Messages (98) and (99) are used to request and acknowledge a request for enabling the Network Access Protocol Stack of a specified Network Access Protocol layer, as indicated by the NET_TYPE fields, of a network node, as indicated by NET_Addr. To disable network access connectivity controlled by the specified Network Access Protocol Stack, the message exchange is similar to that of steps (98) and (99) except that the 3rd field of Network_ACCESS_Control is filled with the string or flag representing disable the Network Access protocol layer. The local network connectivity of the receiver (92) may enable the specified Access Network protocol Stack and be ready for data exchange through the network (910).

A timer (912) may alternatively be set to indicate how long the network access can be maintained. Upon timer time out or through an external input of Sender (91), the control session can terminate. The session can be prematurely terminated when a "DEL Session" trigger is received (911). This will cause an ongoing session to be terminated before the timeout (913). The message type represented in (914) and (915) are used to initiate the process (916) to disable the network connectivity for data exchange. Data Exchange relating to content delivery between 2 nodes is only allowable if the corresponding Access Network Protocol Stack of the same type of communication channel of the 2 nodes are enabled.

Figure 10:
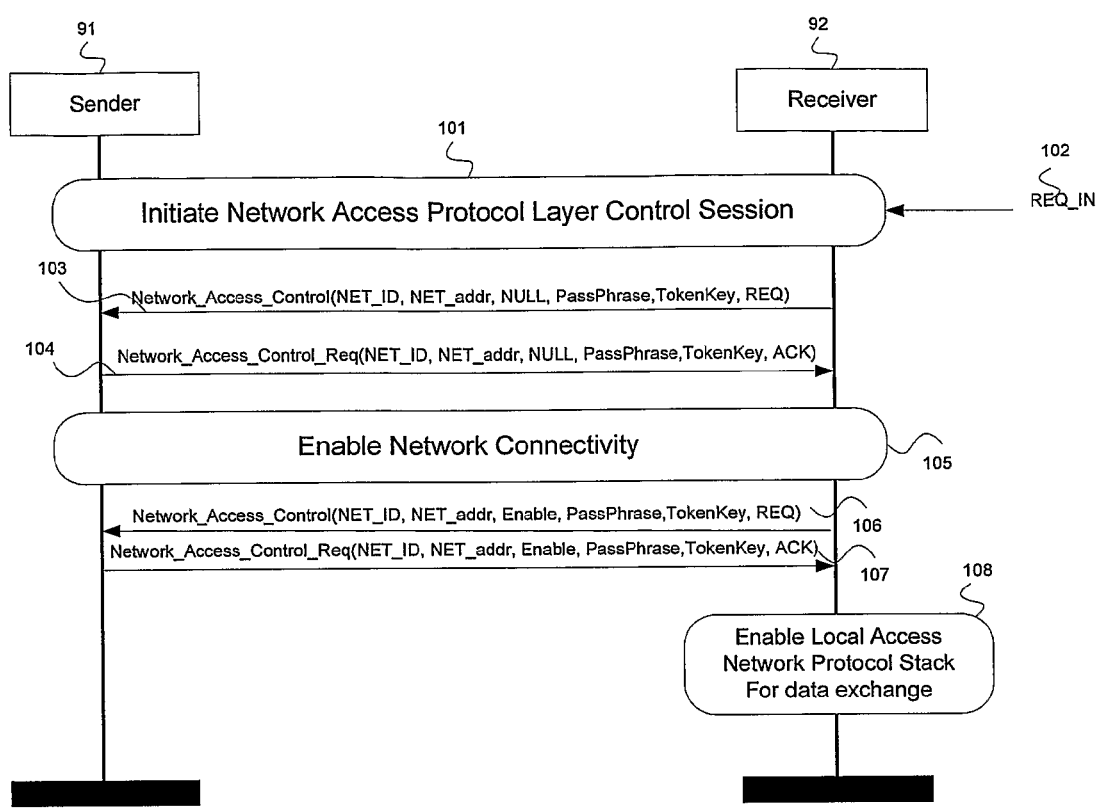
FIG. 10 shows a schematic diagram illustrating receiver triggered access control between network protocol stack unit and Authorization Authority and Authorization Controller according to an example embodiment.

In an alternative embodiment the triggering point may be initiated by the receiver (92) instead of the sender (91), or the triggering is initiated by the network protocol stack itself and the network protocol stack needs to receive Authorization Assertion from the Sender entity (91). As illustrated in FIG. 10, a control session is initiated (101) after the Receiver (92) receives a trigger (102). The Receiver (92) sends a control message to the Sender (103) using the same method as illustrated in FIG. 9 but in the reverse order. The Receiver (92) sends the message with data message encapsulated with the Network_ACCESS_Control structure to the Sender (103) to request for a control session setup. The Sender (91) will reply an acknowledgement for session setup (104). As the Sender (91) holds the decision to authorize the network connectivity, the Receiver (92) will have to seek authorization to a request from the Sender (105). The Receiver (92) sends the control message to the sender (106) seeking authorization. The Sender (91) will send back an acknowledgement message (107) on whether to authorize the access request. If the acknowledgement is positive, steps to enable network connectivity are carried out. This may include enabling the local port for data exchange (108). Subsequent steps to terminate a data exchange session would be similar to steps 911, 913, 914, 915 and 916 shown in FIG. 9. A Receiver (92) initiated termination may not require the acknowledgement from the Sender (91) but notification would be sent to the Sender (91) to inform the Sender (91) of termination occurrence at the Receiver (92) which is at the protocol layer unit (83) (FIG. 8).

The rules specified in the Access Control Policy give flexibility on how the authentication and authorization can be carried out in example embodiments. For example, the authorization may be carried out depending on the availability of the Authorization Authority in the home network. To add additional flexibility, rules may be set such that should the Authorization Authority not be available, then a default access right may be granted to non-registered devices but with very limited capability.

Figure 11:
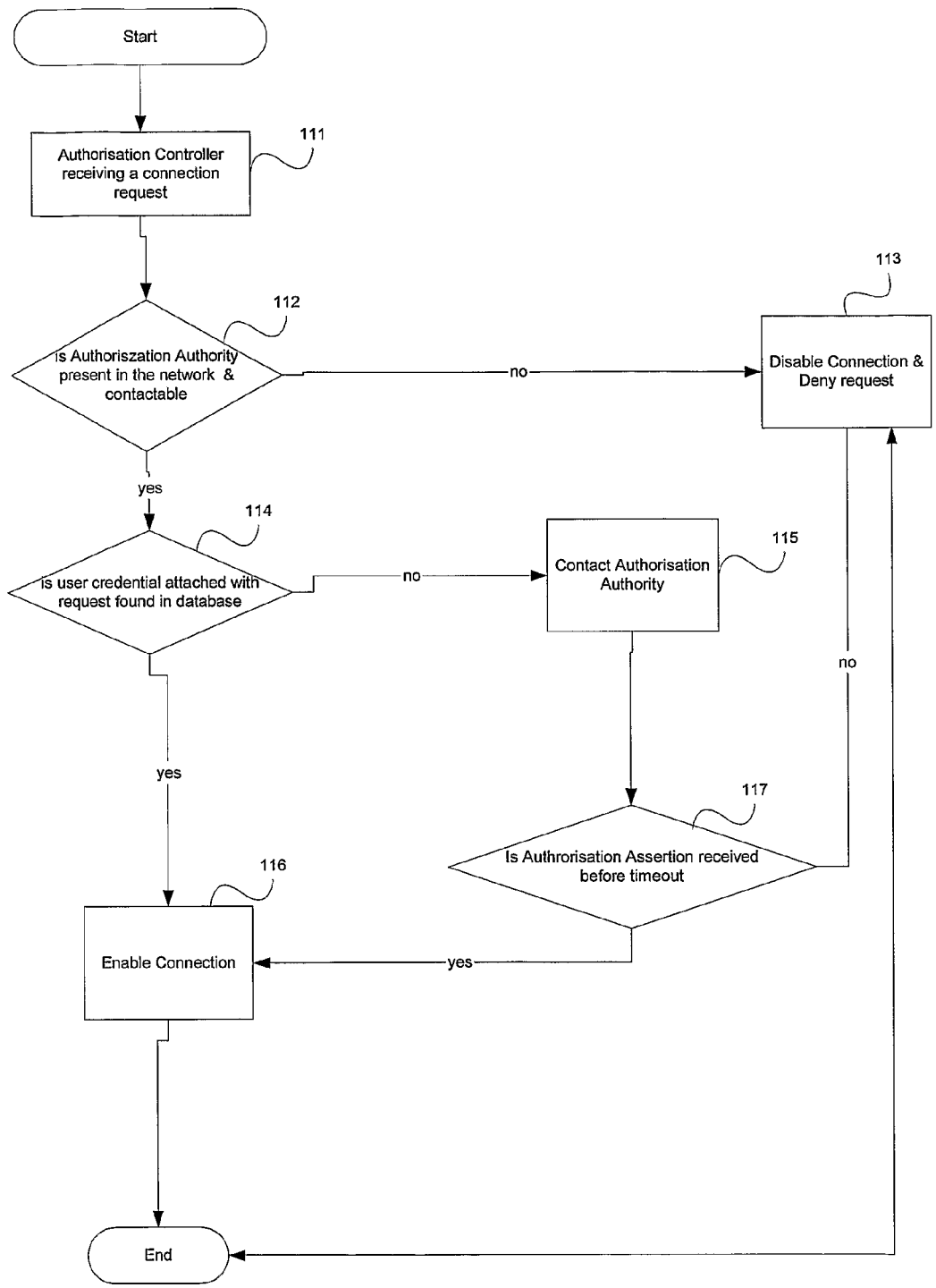
FIG. 11 shows a flow chart illustrating implementation of an access control policy according to an example embodiment.

With reference to FIG. 11, the following checks as stated in an Access Control Policy in an example embodiment may be conducted when a request is received by the Authorization Controller (111).

The Authorization Authority must be present at the network and contactable by Authorization Controller (112). If the Authorization Authority is not present or not contactable, then request to access network will be denied(113).

The Authorization Controller is configured to notify the Authorization Controller under the following conditions:

The Authorization notifies the Authorization Authority when there's a request from an "unidentified" user which is a request from a user whose credentials are not found in the registered user database (114,115)

If the user credentials are found in the user registration database and access rights are within the request, then said request is granted (114, 116).

The Authorization Authority will reply with an Authorization Assertion before a timeout period and the request will be granted (117,116). If the Authorization Controller does not receive a reply before the timeout, the Authorization Controller denies the request from the unidentified user (117,113).

Additional rules may be specified at the Access Control Policy to make it more flexible. For example, if a registered user or tokens are found at the user database, access may be granted according to the access rights specified in the user database. For example, when friends or relatives of the home owner visit the home, a temporary token which is registered at the user database may be distributed to the relatives or friends. With the temporary token, this group of people can have access to the Personal Home Network without requiring the user to register explicitly.

Also, by default all request for access may be refused and only temporary access may be allowed to some devices during some occasions. Therefore, in such an arrangement the Authorization Authority need not receive a query whether to grant access rights for the majority of requests.

Also, the Access Control Policy may be set such that if the Authorization Authority is not inside the Personal Home Network, the Authorization Authority can only authorize a limited number of actions.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

What is claimed is:

1. A network system capable of providing an ad-hoc access environment, the network system comprising:
    a controller unit connected to a network for receiving access requests from a device; and
    an authority unit for providing an authorisation assertion to the controller unit;
    wherein the controller unit carries out an authorisation process based on an access control policy including at least one rule based on which the controller unit contacts the authority unit and the authority unit provides an authorisation assertion; and
    wherein the authority unit resides on a mobile device accessible to a user with administrator rights.

2. The network system as claimed in claim 1, wherein the authority unit requires an assertion from the user with administrator rights for providing the authorisation assertion to the controller unit.

3. The network system as claimed in claim 1, wherein the device requesting access to the network is not registered with the network.

4. The network system as claimed in claim 1, wherein the device requesting access to the network is registered with the network, and the access request comprises a request for a service for which the registered device does not have access rights.

5. The network system as claimed in claim 1, wherein the controller unit comprises a database for storing user registration information and a state table for storing current state information of each device residing in the network.

6. The network system as claimed in claim 1, further comprising one or more service devices residing in the network for providing respective services.

7. The network system as claimed in claim 1, wherein the controller unit comprises a registration program for registering the device to the network.

8. The network system as claimed in claim 7, wherein the registration program is activated based on an administrator key recognised by the controller unit as associated with administrator rights.

9. The network system as claimed in claim 8, wherein the administrator key is received from a storage device external to the controller unit.

10. The network system as claimed in claim 8, wherein the registration program instructs the controller unit to request user registration information from the device requesting to register, to generate a verification including a registration key based on the received user registration information, and to provide the verification including the registration key to the device.

11. The network system as claimed in claim 10, wherein the registration program further instructs the controller unit to provide a temporary key to the device for encrypt the user registration information, and to decrypt the received encrypted user registration information.

12. The network system as claimed in claim 10, wherein the registration program further instructs the controller unit to hash the user registration information and to store the hashed user registration information in a secure database of the network system.

13. The network system as claimed in claim 7, wherein the registration program is configured to have the device registered to the registration program, to configure the device with rights to host the authority unit, and to configure the controller unit to contact the device when an authorisation assertion is required.

14. The network system as claimed in claim 7, wherein the registration program instructs the controller unit to provide an access token to the registered device, and the registered device sends a future access request together with the access token for verification.

15. The network system as claimed in claim 14, wherein the controller unit issues a new access token after each successful login by the registered device.

16. The network system as claimed in claim 1, wherein the controller unit receives user information together with the access request, checks the user information, sends an authorisation assertion query to the authority unit, and grants or denies access based on the authorisation assertion received from the authority unit.

17. The network system as claimed in claim 1, wherein the controller unit receives user information together with the access request, checks the user information, and grants or denies access based on information stored in a database accessible to the controller unit.

18. The network system as claimed in claim 1, wherein the controller unit contacts the authority unit for an authorisation assertion based on the access control policy, and determines whether an access request is received without a valid token indicative of ad-hoc access rights.

19. The network system as claimed in claim 1, wherein the controller unit contacts the authority unit for an authorisation assertion based on the access control policy, and determines whether an access request is received from a registered device without access rights to a device specified in the access request.

20. The network system as claimed in claim 1, wherein the access control policy comprises rules depending on a current location of the authority unit.

21. The network system as claimed in claim 20, wherein the controller unit sends a control message to a network protocol access layer of the network to enable a local port, and receives an acknowledgement from the network protocol access layer indicating whether the local port is enabled or disabled.

22. The network system as claimed in claim 21, wherein the access control policy comprises a rule such that access to the network requested by a nonregistered device is granted only if the authority unit is present in the network.

23. The network system as claimed in claim 1, wherein the authority unit sends a message to the controller unit based on input from a user with administrator rights indicating revocation of access rights of the device.

24. The network system as claimed in claim 23, wherein the controller unit removes a table entry of the device and terminates an ongoing session of the device.

25. The network system as claimed in claim 23, wherein the device is a registered device, and the controller deletes a registration entry of the registered device, invalidates an access token of the de-registered device, and denies a future access request by the de-registered device.

26. The network system as claimed in claim 1, wherein the network comprises an access network with protocol processing entities capable of network connectivities using different or similar network protocol stacks, and the device requesting the access comprises one of the network protocol stacks.

27. The network system as claimed in claim 26, wherein a format for control messages between the controller unit and a network access protocol unit of the access network comprises one or more of a group consisting of network type for identifying a network interface, network address for identifying the network address of a network entity seeking network connectivity, enable/disable flag to indicate enable or disable network connectivity by enabling or disabling the network protocol stack controlling the network connectivity as identified by the network type, passphrase during the active session between the protocol stack of the network type and the controller unit of the authority unit.

28. The network system as claimed in claim 27, wherein the passphrase is accompanied with a token key identifying the authority unit or the controller unit to the network protocol stack, and req/ack which is a request of an action within a session.

29. A method of providing an ad-hoc access environment in a network, the method comprising:
receiving access requests from a device utilising a controller unit of the network; and
providing an authorisation assertion to the controller unit utilising an authority unit of the network;
wherein the controller unit carries out an authorisation process based on an access control policy including at least one rule based on which the controller unit contacts the authority unit and the authority unit provides an authorisation assertion; and
wherein the authority unit resides on a mobile device accessible to a user with administrator rights.

30. The method as claimed in claim 29, wherein the authority unit requires an assertion from the user with administrator rights for providing the authorisation assertion to the controller unit.

31. The method as claimed in claim 29, wherein the device requesting access to the network is not registered with the network.

32. The method as claimed in claim 29, wherein the device requesting access to the network is registered with the network, and the access request comprises a request for a service for which the registered device does not have access rights.

33. The method as claimed in claim 29, wherein the controller unit comprises a database for storing user registration information and a state table for storing current state information of each device residing in the network.

34. The method as claimed in claim 29, wherein the controller unit comprises a registration program for registering the device to the network.

35. The method as claimed in claim 34, wherein the registration program is activated based on an administrator key recognised by the controller unit as associated with administrator rights.

36. The method as claimed in claim 35, wherein the administrator key is received from a storage device external to the controller unit.

37. The method as claimed in claim 35, wherein the registration program instructs the controller unit to request user registration information from the device requesting to register, to generate a verification including a registration key based on the received user registration information, and to provide the verification including the registration key to the device.

38. The method as claimed in claim 37, wherein the registration program further instructs the controller unit to provide a temporary key to the device to encrypt the user registration information, and to decrypt the received encrypted user registration information.

39. The method as claimed in claim 37, wherein the registration program further instructs the controller unit to hash the user registration information and to store the hashed user registration information in a secure database of the network.

40. The method as claimed in claim 34, wherein the registration program is configured to have the device registered to the registration program, to configure the device with rights to host the authority unit, and to configure the controller unit to contact the device when an authorisation assertion is required.

41. The method as claimed in claim 34, wherein the registration program instructs the controller unit to provide an access token to the registered device, and the registered device sends a future access request together with the access token for verification.

42. The method as claimed in claim 41, wherein the controller unit issues a new access token after each successful login by the registered device.

43. The method as claimed in claim 29, wherein the controller unit receives user information together with the access request, checks the user information, sends an authorisation assertion query to the authority unit, and grants or denies access based on the authorisation assertion received from the authority unit.

44. The method as claimed in claim 29, wherein the controller unit receives user information together with the access request, checks the user information, and grants or denies access based on information stored in a database accessible to the controller unit.

45. The method as claimed in claim 29, wherein the controller unit contacts the authority unit for an authorisation assertion based on the access control policy, and determines whether an access request is received without a valid token indicative of ad-hoc access rights.

46. The method as claimed in claim 29, wherein the controller unit contacts the authority unit for an authorisation assertion based on the access control policy, and determines whether an access request is received from a registered device without access rights to a device specified in the access request.

47. The method as claimed in claim 29, wherein the access control policy comprises rules depending on a current location of the authority unit.

48. The method as claimed in claim 47, wherein the controller unit sends a control message to a network protocol access layer of the network to enable a local port, and receives an acknowledgement from the network protocol access layer indicating whether the local port is enabled or disabled.

49. The method as claimed in claim 48, wherein the access control policy comprises a rule such that access to the network requested by a non-registered device is granted only if the authority unit is present in the network.

50. The network as claimed in claim 29, wherein the authority unit sends a message to the controller unit based on input from a user with administrator rights indicating revocation of access rights of the device.

51. The method as claimed in claim 50, wherein the controller unit removes a table entry of the device and terminates an ongoing session of the device.

52. The method as claimed in claim 50, wherein the device is a registered device, and the controller deletes a registration entry of the registered device, invalidates an access token of the de-registered device, and denies a future access request by the de-registered device.

53. The method as claimed in claim 29, wherein the network comprises an access network with protocol processing entities capable of network connectivities using different or similar network protocol stacks, and the device requesting the access comprises one of the network protocol stacks.

54. The method as claimed in claim 53, wherein a format for control messages between the controller unit and a network access protocol unit of the access network comprises one or more of a group consisting of network type for identifying a network interface, network address for identifying the network address of a network entity seeking network connectivity, enable/disable flag to indicate enable or disable network connectivity by enabling or disabling the network protocol stack controlling the network connectivity as identified by the network type, passphrase during the active session between the protocol stack of the network type and the controller unit of the authority unit.

55. The method as claimed in claim 54, wherein the passphrase is accompanied with a token key identifying the authority unit or the controller unit to the network protocol stack, and req/ack which is a request of an action within a session.

* * * * *